United States Patent [19]

Smith

[11] 4,076,794

[45] Feb. 28, 1978

[54] PROCESS FOR THE PRODUCTION OF HIGH PURITY ALKALI METAL TETRAHALOALUMINATES AND PRODUCTS PRODUCED THEREBY

[75] Inventor: William Novis Smith, Exton, Pa.

[73] Assignee: Foote Mineral Company, Exton, Pa.

[21] Appl. No.: 493,568

[22] Filed: Aug. 1, 1974

[51] Int. Cl.$^2$ .......................... C01D 3/00; C01F 7/04; C01F 7/48

[52] U.S. Cl. .................................. 423/463; 423/462; 423/466

[58] Field of Search ........................ 423/463, 462, 466

[56] References Cited

U.S. PATENT DOCUMENTS

| | | | |
|---|---|---|---|
| 3,440,296 | 4/1969 | Walker | 423/463 X |
| 3,761,578 | 9/1973 | Anderson | 423/463 |
| 3,832,452 | 8/1974 | Crouch, Jr. | 423/463 X |

OTHER PUBLICATIONS

Hackh's Chemical Dictionary, 4th Ed., 1969, by Julius Grant, p. 31, Published by McGraw-Hill Book Co., New York.

*Primary Examiner*—Edward Stern
*Attorney, Agent, or Firm*—Howson and Howson

[57] ABSTRACT

A process is described for the production of sodium, potassium or lithium tetrahaloaluminates, in which the halogen may be chlorine, bromine or iodine, by the reaction of an aluminum halide with at least the stoichiometric amount of an alkali metal halide in the presence of powdered aluminum metal and a stable liquid hydrocarbon solvent, preferably an aromatic hydrocarbon solvent or mixtures of aromatic and saturated hydrocarbon solvents, at a temperature in the range from about 60° C. up to the reflux temperature of the reaction mixture, filtering the hot reaction mixture to remove remaining aluminum metal and other solids, cooling the filtrate to below about 30° C., and separating and washing the resulting crystals to obtain the substantially pure alkali metal tetrahaloaluminate; the entire process being carried out under anhydrous conditions and an inert atmosphere.

13 Claims, No Drawings

PROCESS FOR THE PRODUCTION OF HIGH PURITY ALKALI METAL TETRAHALOALUMINATES AND PRODUCTS PRODUCED THEREBY

BACKGROUND OF THE INVENTION

Alkali metal tetrahaloaluminates and, particularly, lithium aluminum chloride, are low melting salts which are known to be useful as electrolytes in non-aqueous power sources such as thermal batteries and primary or secondary cells, as low melting point solvents in spectroscopy, and in other applications for which low melting point salts are employed. While the potential value of such low melting salts in a variety of applications is substantial, their utility has been limited in the past in certain applications by the fact that such materials are normally obtained in relatively impure form from known production processes, whereas their use applications require a highly purified product. More specifically, lithium aluminum chloride and similar salts which have been prepared in the past normally contain substantial amounts of impurities, including oxygen-containing materials such as water and the hydroxides, inorganic metal salts, carbon derived from carbonaceous solvents or organic reactants, and metals such as iron, among others. For this reason, lithium aluminum chloride and other alkali metal tetrahaloaluminates are normally heavily discolored as manufactured, indicating a substantial content of the foregoing impurities.

Purification of lithium aluminum chloride and similar alkali metal tetrahaloaluminates is difficult since treatments suitable for the removal of one type of impurity seldom remove other impurities, and, indeed, make such removal more difficult in some cases. Moreover, inasmuch as aluminum chloride has a high vapor pressure at atmospheric pressure, it may vaporize from the lithium aluminum chloride, for example, if the material is heated during the purification treatment. When aluminum chloride is lost in this way, the lithium chloride or other alkali metal halides which remain are difficult to separate from the desired product.

THE PRIOR ART

Methods for the preparation of relatively pure lithium aluminum chloride have been suggested previously, among which may be mentioned that disclosed in Anderson U.S. Pat. No. 3,761,578 issued Sept. 25, 1973. In the Anderson process, hydrogen chloride gas is passed through a melt of lithium aluminum chloride containing impurities such as water, hydroxides, or other inorganic oxygen-containing salts, carbon, and iron, to remove at least a portion of the water and oxygen-containing impurities. Thereafter the melt is heated to a temperature of from about 425° to about 540° C. and chlorine gas is passed through the melt to remove carbon impurities. The melt is then cooled to about 190° C. to 260° C. and contacted with aluminum which replaces the iron in solution due to its higher electrochemical potential. The purified melt is then filtered and cooled. While it is reported that this process produces a product having less than 300 parts per billion of impurities, it has the obvious disadvantages of requiring the fusion of metallic salts and the handling of hydrogen chloride and chlorine gases which present manufacturing difficulties.

Gabano U.S. Pat. No. 3,533,853, issued Oct. 13, 1970, relates to secondary electrochemical generators in which the electrolyte comprises a complex of lithium aluminum chloride and tetrahydrofuran. Gabano U.S. Pat. No. 3,542,603, issued Nov. 24, 1970, also relates to non-aqueous electrolytes for primary electrical generators which contain a complex of tetrahydrofuran and lithium aluminum chloride.

Long et al U.S. Pat. No. 3,651,159, issued Mar. 21, 1972, teaches the formation of bimetallic halides of copper or another Group IB metal and a Group IIIA metal. In Example 1, cuprous chloride is mixed with aluminum chloride, both in the form of dry powders, in dry benzene under an inert atmosphere and stirred for 1 hour, presumably to form cuprous aluminum chloride.

Certain other disclosures in the prior art of marginal interest may also be mentioned. For example, Stenmark U.S. Pat. No. 3,707,577, issued Dec. 26, 1972, relates to a method for the separation of aromatics, which employs lithium aluminum chloride to complex with an aromatic and facilitate its separation from closely related aromatics.

Murray U.S. Pat. No. 2,945,911, issued July 19, 1960, is also of marginal interest in that it relates to the purification of hydrocarbon streams by removal of aluminum chloride catalyst by the formation of double salts of aluminum chloride with various alkali metal halides.

From the foregoing, it is apparent that although high purity alkali metal tetrahaloaluminates have a variety of known utilities, their commercial use has been limited previously by the fact that no method has been known for the preparation of such materials in high purity in an economical and convenient manner.

It is, therefore, a primary object of the present invention to provide an economic and convenient process for the production of high purity alkali metal tetrahaloaluminates.

It is another object of the invention to provide such a method which does not require salt fusion or the handling of hydrogen chloride or chlorine gases.

It is a further object of the invention to eliminate the need for time consuming, expensive and inconvenient purification procedures in the production of highly pure alkali metal tetrahaloaluminates.

It is still another object of the invention to provide a method for the production of alkali metal tetrahaloaluminates in a solution from which a highly pure product can be separated directly by a simple crystallization procedure in a finely divided state, thus requiring no further grinding for use.

SUMMARY OF THE INVENTION

The foregoing objects and others which will be apparent from the following description of the invention are achieved by the reaction of an anhydrous aluminum halide with the stoichiometric amount or preferably an excess of an alkali metal halide in the presence of powdered aluminum metal and stable liquid hydrocarbon solvents, preferably aromatic hydrocarbon solvents or mixtures of aromatic solvents with saturated hydrocarbon solvents, at a temperature in the range from about 60° C. up to the reflux temperature of the reaction mixture, filtering the hot reaction mixture to remove the solids consisting of unreacted aluminum metal and alkali metal halide, cooling the filtrate to below about 30° C. in order to crystallize the alkalimetal tetrahaloaluminate, and separating and washing the resulting crystals by conventional means to obtain a substantially pure product. The entire process is carried out under anhydrous conditions and an inert atmosphere of argon, helium or nitrogen, due to the reactivity of the aluminum halides and alkali metal tetrahaloaluminates.

The alkali metal tetrahaloaluminates which may be produced in high purity in this way may be represented by the formula $$M_xM_z'M''_{1-(x+z)}AlX_{4-(y+w)}X_y'X_w''$$

in which M, M' and M'' are alkali metals of the group consisting of sodium, lithium and potassium, and X, X' and X'' are halogens of the group consisting of Cl, Br and I. It should be recognized that since the mole ratio of alkali metal to aluminum in the alkali metal tetrahaloaluminates is about 1:1, that the values of $x$ and $z$ may range from 0 up to about 1 and that the value of the expression $[1-(x+z)]+x+z$ must be about 1. Similarly, since the mole ratio of halogen to aluminum must be about 4:1 in these materials, the values of $y$ and $w$ may range from 0 up to about 4 and the value of the expression $[4-(y+w)]+y+w$ must be about 4. The value of the expression $1-(x+y)+x+z$ is not necessarily exactly 1, however, since the ratio of alkali metal to aluminum may vary from about 0.85 to about 1.05. Similarly, the value of the expression $[4-(y+w)]+y+w$ need not be exactly 4, since the ratio of halogen to aluminum may vary from about 3.85 to about 4.05. It is desirable, however, that the mole ratio of lithium to aluminum be close to 1.0 or greater, since this enhances the stability of the compounds or complexes in organic solvents.

In view of the fact that the aluminum halides and the alkali metal tetrahaloaluminates are highly reactive materials which will react with water and even moisture in the atmosphere, among other things, it is essential that all reagents, solvents and equipment be dry and that the reaction be run under anhydrous conditions under an inert atmosphere. Any suitable dry, inert gas may be used as the inert atmosphere; argon and nitrogen being preferred due to their ready availability.

The primary reactant is, of course, the aluminum halide. Aluminum chloride is the preferred reactant due to its relatively low cost, availability and high degree of stability toward handling. Aluminum bromide is also useful, although less preferred due to its higher cost. Aluminum iodide may also be employed, although it is still less preferred because of its higher cost. The alkali metal halides may be any sodium, potassium or lithium chloride, bromide or iodide or mixtures or double salts thereof.

Inasmuch as the aluminum halide is the primary reactant and it would be undesirable for such materials to remain in the reaction mixture after the reaction is completed, it is necessary to employ at least the stoichiometric amount of alkali metal halide to react with the aluminum halide and it is preferred to use a 5 to 10% excess of the alkali metal halide to ensure complete reaction of the aluminum halide.

The reaction is carried out in a suitable liquid aromatic hydrocarbon solvent or mixture of aromatic hydrocarbons with saturated hydrocarbons which is stable under the reaction conditions and should have a boiling point such as to permit reflux at atmospheric pressure at a reaction temperature in the range from about 60° C. to about 200° C. While benzene may be employed, it is not as desirable as the methyl-substituted aromatics such as toluene, and the ortho-, meta- and para-xylenes, and other higher alkyl substituted aromatics. Cyclohexane, which is a desirable reaction medium by itself, may also be mixed with benzene to provide a desirable reaction medium. Tetrahydrofuran and other solvents of the prior art containing non-hydrocarbon atoms are not desirable reaction media in the present invention.

A reactive metal reducing agent such as aluminum or lithium is employed in the process. While lithium is useful, its high cost dictates the use of powdered aluminum for this purpose, since the latter is readily available, inexpensive and entirely satisfactory for the purpose of reducing iron and other impurities in the reaction mixture. The aluminum metal should, of course, be finely divided to increase its effectiveness and is preferably "atomized" by conventional techniques.

It will be obvious that the identity of the reaction product depends upon the reactants selected and their relative proportions. The preferred aluminum halide, as noted above, is aluminum chloride, but the bromide or iodide may be employed as the sole primary reactant or a mixture of the aluminum halides may be employed. Similarly, while the preferred alkali metal halide is lithium chloride, any sodium, potassium or lithium, chloride, bromide or iodide, or mixtures thereof, may be used to obtain the desired ratio of aluminum, sodium, potassium, lithium, chloride, bromide and iodide in the final product. The alkali metal halides are preferably used in up to 10% excess as noted above; any unreacted alkali metal halide being removed as a solid by filtration of the hot reaction mixture. The molar ratio of the aluminum halide reactant, whether it is a single salt or a mixture of such salts, to the alkali metal halide reactant, whether the latter is a single salt or a mixture thereof, is normally in the range from about 1:1 to about 1:1.1, although it may be as high as 1:1.2, if desired.

The ratio of aluminum or other reducing metal to the total amount of aluminum halide and alkali metal halide reactants in the reaction mixture is in the range from about 1% to about 10% by weight.

The liquid aromatic hydrocarbon solvent or mixture of aromatic and saturated hydrocarbons is employed in an amount sufficient to provide a suitable volume of reaction medium to obtain adequate solution of the reactants at reflux and dispersal of product on cooling. Generally, about 65 to about 400 ml of solvent per mole of total product is sufficient.

The reaction is conducted at a temperature of about 60° C. to about 200° C., preferably under reflux conditions as noted above, until it goes to completion, i.e., until substantially all of the aluminum halide is consumed. This normally requires about one-half hour but longer or shorter reaction times may be necessary depending upon the reaction temperatures employed and the relative reactivity of the reactants. The reaction mixture is then filtered hot, at a temperature of about 90° to 110° C. as a rule, to prevent loss of product by premature crystallization.

Optionally, a small amount (e.g. about 0.1%) of lithium hydride, lithium aluminum hydride, organolithium compounds, or the like, may be added to the reaction mixture at the end of the reaction to ensure complete reduction of any remaining impurities.

The filtrate is then cooled to cause the desired product, an alkali metal tetrahaloaluminate, to separate almost completely by crystallization which normally will occur at temperatures below about 30° C. The resulting crystals may then be separated by filtration, decantation or other conventional means and washed to remove adherent filtrate and impurities. The wash liquid may be any suitable dry hydrocarbon solvent such as cold toluene or other aromatic hydrocarbon, or a pentane-aromatic solvent mixture, or cylcohexane, for example.

The washed crystals may then be dried under vacuum or by other conventional means, being careful to maintain an inert gas atmosphere throughout the entire procedure.

The resulting alkali metal tetrahaloaluminates are highly pure materials typically containing less than 2 ppm iron, 2 ppm zinc, and 100 ppm water. Due to the purity of these products, they are typically colorless or water white initially and transparent as compared to the typically yellow or highly colored products obtained by the processes of the prior art. (The presence of trace organic impurities will cause slight yellowing on standing.)

The invention will now be illustrated in greater detail in conjunction with the following illustrative examples of the process.

EXAMPLE I

A three-neck, round bottom, glass flask equipped with a stirrer, reflux condenser, and thermometer was purged with an inert gas (nitrogen or argon) and then charged with 30.7 g (0.525 m.) sodium chloride, 2.5 g atomized aluminum (0.5 m.) powder and 130 ml toluene (sodium-dried), and 33.3 g (0.25 m.) anhydrous aluminum chloride. The slurry was heated to about 80° C. with stirring and another 33.3 g (0.25 m.) anhydrous aluminum chloride added. The slurry was then heated to reflux and maintained at this temperature for 20 minutes until color of slurry was gray. The slurry was filtered through a fritted glass filter funnel under inert gas pressure at about 100° C. The precipitate on the filter was essentially aluminum metal powder. The solution was cooled with stirring to 10° C. to crystallize the product. The slurry was filtered and the precipitate washed with cold toluene and then dried under vacuum. The filtrate can be evaporated to recover additional product if desired. The entire reaction and isolation of product was performed under inert gas. The resultant white, crystalline sodium tetrachloroaluminate had a m.p. of 150°-152° C.

Analysis: Na, 11.46%; Al, 14.00%.

EXAMPLE II

The procedure of Example I was used. The quantities of reagents were 94.0 g (0.71 m.) anhydrous aluminum chloride, 100.0 g (0.75 m.) anhydrous lithium iodide, 5 g atomized aluminum powder, 300 ml cyclohexane, and 40 ml benzene (sodium-dried). The white crystalline product had a m.p. of 70.0°-79.5° C. and analyzed as $LiAlICl_3$.

Analysis: Li, 2.54%; Al, 10.11%; I, 52%.

EXAMPLE III

The procedure of Example I was used. The quantities of reagents used were 91.2 g (1.05 m.) anhydrous lithium bromide 133.3 g (1.00 m) anhydrous aluminum chloride, 130 ml toluene (sodium-dried). The white crystalline lithium bromotrichloroaluminate had a m.p. of 123° C. and analyzed as $LiAlBr_{0.9}Cl_{3.1}$.

Analysis: Li, 2.92%; Al, 13.16%; Cl, 47.8%.

EXAMPLE IV

The procedure of Example I was used. The quantities of reagents were 46.0 g (0.53 m.) anhydrous lithium bromide, 133.3 g (0.50 m.) anhydrous aluminum bromide, 2.5 g atomized aluminum metal powder, and 200 ml benzene (sodium-dried). The isolated lithium tetrabromoaluminate had a m.p. of 192° C.

Analysis: Li, 1.89%; Al, 8.67%.

EXAMPLE V

The procedure of Example I was used. The quantities of reagents were 17.5 g (0.30 m.) anhydrous sodium chloride, 9.5 g (0.22 m.) anhydrous lithium chloride, 66.6 g (0.50 m.) anhydrous aluminum chloride, 5 g atomized aluminum powder, and 130 ml toluene (sodium-dried). The isolated $Na_{0.5}Li_{0.5}AlCl_4$ had a m.p. of 82°-84° C.

Analysis: Li, 1.77%; Na, 6.02%; Al, 15.09%.

EXAMPLE VI

The procedure of Example I was used. The quantities of reagents were 51.4 g (0.50 m.) anhydrous sodium bromide, 66.7 g (0.50 m.) anhydrous aluminum chloride, 5.0 g. atomized aluminum metal powder, 130 ml toluene (sodium-dried), and 130 ml xylene (sodium-dried). The isolated sodium bromotrichloroaluminate had a m.p. of 148°-150° C. and analyzed as $NaAlBr_{0.8}Cl_{3.2}$.

Analysis: Na, 9.39%; Al, 12.32%; Br, 28.9%.

EXAMPLE VII

The procedure of Example I was used. The quantities of reagents were 21.2 g (0.50 m.) anhydrous lithium chloride, 133.3 g (0.50 m.) anhydrous aluminum bromide, 5 g atomized aluminum powder, and 65 ml benzene (sodium-dried). The isolated lithium chlorotribromoaluminate had a m.p. of 162°-169° C.

Analysis: Li, 2.15%; Al, 9.39%; Cl, 12.36%.

EXAMPLE VIII

The procedure of Example I was used. The quantities of reagents used were 35.1 g (0.26 m.) anhydrous lithium iodide, 66.7 g (0.25 m.) anhydrous aluminum bromide, 1.2 g atomized aluminum powder, 33 ml benzene, and 33 ml cyclohexane. The isolated lithium iodotribromoaluminate had a m.p. of 161°-164° C. and analyzed for $LiAlI_{0.75}Br_{3.25}$.

Analysis: Li, 1.75%; Al, 7.02%; Br, 67.51%; I, 23.72%.

EXAMPLE IX

The procedure of Example I was used. The quantities of reagents used were 91.2 g (1.04 m.) anhydrous lithium bromide, 66.7 g (0.25 m.) anhydrous aluminum bromide, 100.0 g (0.75 m.) anhydrous aluminum chloride, 1.2 g atomized aluminum metal, and 130 ml benzene (sodium-dried). The isolated lithium dibromodichloroaluminate had a m.p. of 134°-136° C. and analyzed as $LiAlBr_{1.5}Cl_{2.5}$.

Analysis: Li, 2.85%; Al, 11.05%; Cl, 37.7%; Br, 49.44%.

While the invention has been described above in conjunction with certain specific preferred embodiments thereof, these are merely illustrative of other embodiments which will be apparent to those skilled in the art and, therefore, the scope of the invention is considered to be limited only by the prior art and the appended claims.

What is claimed is:

1. A process for the production of high purity alkali metal tetrahaloaluminates of the formula

$$M_xM'_zM''_{1-(x+z)}AlX_{4-(y+w)}X'_yX''_w$$

wherein M, M' and M" are different alkali metals of the group consisting of Na, K and Li, X, X' and X" are different halogens of the group consisting of Cl, Br and I, the values of $x$ and $z$ range from 0 up to 1 and $[1-(x+z)]+x+z$ is about 1, the values of $y$ and $w$ range from 0 up to about 4 and $[4-(y+w)]+y+w$ is about 4, which comprises:

(a) reacting an aluminum halide selected from the group consisting of aluminum chloride, aluminum bromide, aluminum iodide and mixtures thereof with at least the stoichiometric amount of an alkali metal halide selected from the group consisting of sodium, potassium and lithium chloride, bromide and iodide, mixtures and double salts thereof in the presence of powdered aluminum metal and a stable liquid hydrocarbon at a temperature in the range from about 60° C. up to the reflux temperature of the reaction mixture, (b) filtering the hot reaction mixture to remove the aluminum metal and other solids, (c) cooling the filtrate to below about 30° C., and (d) separating the resulting crystals of substantially pure alkali metal tetrahaloaluminate from the filtrate; the entire process being carried out under anhydrous conditions and an inert atmosphere.

2. The process of claim 1 wherein the aluminum halide is aluminum chloride.

3. The process of claim 1 wherein the aluminum halide is aluminum bromide.

4. The process of claim 1 wherein the stable liquid aromatic hydrocarbon is selected from the group consisting of toluene, xylene, benzene, cyclohexane and mixtures thereof.

5. The process of claim 1 wherein the aluminum halide is aluminum chloride and the alkali metal halide is lithium chloride.

6. The process of claim 5 wherein the liquid aromatic hydrocarbon is selected from the group consisting of toluene, xylene, benzene, cyclohexane, and mixtures thereof.

7. The process of claim 2 wherein the alkali metal halide is a lithium halide or mixture of different lithium halides.

8. The process of claim 3 wherein the alkali metal halide is lithium halide or mixture of different lithium halides.

9. The process of claim 2 wherein the alkali metal halide is a sodium halide or mixture of different sodium halides.

10. The process of claim 2 wherein the alkali metal halide is a potassium halide or mixture of different potassium halides.

11. Highly pure and colorless lithium iodotrichloroaluminate having the empirical formula $LiAlICl_3$.

12. Highly pure and colorless sodium lithium tetrachloroaluminate having the empirical formula $Na_{0.5}Li_{0.5}AlCl_4$.

13. Highly pure and colorless lithium bromotrichloroaluminate having the empirical formula $LiAlBr_{0.9}Cl_{3.1}$.

* * * * *